US009475362B2

(12) United States Patent
Richter

(10) Patent No.: US 9,475,362 B2
(45) Date of Patent: Oct. 25, 2016

(54) HEATING VENTILATING AND AIR CONDITIONING DEVICE FOR A VEHICLE

(75) Inventor: Gerald Richter, Aachen (DE)

(73) Assignee: HANON SYSTEMS, Daejeon-Si (KR)

(*) Notice: Subject to any disclaimer, the term of this patent is extended or adjusted under 35 U.S.C. 154(b) by 1134 days.

(21) Appl. No.: 13/310,175

(22) Filed: Dec. 2, 2011

(65) Prior Publication Data
US 2012/0138697 A1 Jun. 7, 2012

(30) Foreign Application Priority Data

Dec. 3, 2010 (DE) ........................ 10 2010 062 406

(51) Int. Cl.
B60H 1/32 (2006.01)
B60H 1/00 (2006.01)

(52) U.S. Cl.
CPC ... *B60H 1/3233* (2013.01); *B60H 2001/00085* (2013.01)

(58) Field of Classification Search
CPC .................. B60H 1/3233; B60H 2001/00085
USPC .......................................................... 62/285
See application file for complete search history.

(56) References Cited

U.S. PATENT DOCUMENTS

| 5,755,107 | A | * | 5/1998 | Shirota | .............. | B60H 1/00028 |
| | | | | | | 165/42 |
| 6,129,140 | A | * | 10/2000 | Kawahara | .......... | B60H 1/00521 |
| | | | | | | 165/42 |
| 6,382,305 | B1 | * | 5/2002 | Sano | .................... | B60H 3/0608 |
| | | | | | | 165/103 |
| 6,716,100 | B2 | | 4/2004 | Tsunooka et al. | | |
| 7,284,388 | B2 | | 10/2007 | Yoshida | | |
| 7,392,663 | B2 | | 7/2008 | Kang et al. | | |
| 7,721,565 | B2 | | 5/2010 | Williams et al. | | |
| 2003/0056531 | A1 | * | 3/2003 | Nishida | .............. | B60H 1/00064 |
| | | | | | | 62/244 |
| 2006/0065388 | A1 | * | 3/2006 | Newman | ............ | B60H 1/00028 |
| | | | | | | 165/202 |
| 2006/0242984 | A1 | * | 11/2006 | Kang | ................... | B60H 1/3233 |
| | | | | | | 62/285 |
| 2008/0083241 | A1 | * | 4/2008 | Nagata | ............... | B60H 1/00064 |
| | | | | | | 62/271 |
| 2009/0159237 | A1 | | 6/2009 | Kuwabara et al. | | |

FOREIGN PATENT DOCUMENTS

| EP | 1790511 A2 | 5/2007 |
| EP | 2000338 A1 | 12/2008 |
| JP | 11170841 | 6/1999 |
| JP | 2007126101 | 5/2007 |
| JP | 2008013117 | 1/2008 |
| JP | 2008062843 | 3/2008 |
| JP | 2008302779 | 12/2008 |
| WO | 2008029867 | 3/2008 |

\* cited by examiner

*Primary Examiner* — Emmanuel Duke
(74) *Attorney, Agent, or Firm* — Fraser Clemens Martin & Miller LLC; James D. Miller

(57) ABSTRACT

The invention relates to an HVAC device for a vehicle including an inlet casing, an air distribution casing, and a blower located in a blower casing for drawing air through the inlet casing and delivering the air into the air distribution casing. The device further includes an evaporator in the air distribution casing and a drainage system below the evaporator for draining off liquid condensed out of the air at the surface of the evaporator into the environment of the HVAC device. The inlet casing is positioned such that liquid penetrating the inlet casing accumulates in a lower area of the inlet casing. Between the lower area of the inlet casing and the drainage system of the liquid condensed out at the evaporator, a hydraulic connection is configured such that the liquid is drainable from the inlet easing past the blower casing and evaporator into the drainage system.

20 Claims, 3 Drawing Sheets

HEATING VENTILATING AND AIR CONDITIONING DEVICE FOR A VEHICLE

CROSS-REFERENCE TO RELATED APPLICATION

This application claims the benefit of priority of German Patent Application Serial No. DE 10 2010 062 406.3 filed on Dec. 3, 2010, the entire disclosure of which is hereby incorporated herein by reference.

FIELD OF THE INVENTION

The invention relates to an HVAC device for a vehicle with an inlet casing, an air distribution casing and a blower located in a blower casing for drawing air through the inlet casing and delivering the air into the air distribution casing. Further, the HVAC device includes a drainage system. The drainage system is disposed below the evaporator, which is disposed in the air distribution casing. The drainage system allows for draining off water that condenses out of the air at the surface of the evaporator.

BACKGROUND OF THE INVENTION

The prior art teaches HVAC devices that, particularly when the air to be conditioned cools down while passing the evaporator of the refrigerant circuit, direct water condensed out of the air through a drainage system into the vehicle. In traditional systems, water that enters from the exterior into the HVAC device through, for example, the fresh air inlet, is not drained off through a drainage system. The water that penetrates the HVAC device through the fresh air inlet during, for example, car washing, accumulates within the inlet casing and can then penetrate the interior of the vehicle. The penetration of the water in the interior of the vehicle when the drainage of the water into the vehicle environment is not efficient occurs mores when the HVAC device is placed centrally in the vehicle with a fresh air inlet placed low relative to the evaporator of the refrigerant circuit.

Conducting water that penetrated the HVAC device into the interior of the vehicle can be avoided, at least partly, using HVAC devices of the generic type.

Prior art teaches an arrangement for draining water of a vehicle HVAC system comprising an air inlet channel, a blower with a blower casing, a casing of the HVAC system, and water guiding members for draining off water entering through the air inlet channel and transported in the direction of the blower into the HVAC system. The outflow opening of the additional drainage system on the bottom side of the air inlet channel, through which the water entering through the air inlet and into the air inlet channel is drainable from the casing or the air current before reaching the blower, should be avoided. In addition to having an additional drainage system provided within the HVAC device, another opening in the front of the vehicle is necessary, requiring another front seal.

EP 1 674 310 B1 describes a two-layer HVAC system comprising a blower provided with a suction channel and a double suction scroll casing, and an HVAC system casing. In the HVAC system casing, an evaporator is arranged for cooling the air the blower delivers. The condensation water condensed out of the air at the evaporator is drained off from the HVAC system casing over an outlet placed below the evaporator. Water that enters into the blower through the suction channel is also directed to the outlet for the condensation water by means of a drainage system including a drain pipe and a drain channel.

The drainage system prevents the back drawing of water that has already passed through the blower. Accordingly, the water that accumulates below the blower is directed to the drainage only after passing the blower.

EP 1 790 511 B1 discloses an arrangement for the air conditioning of a motor vehicle driver cabin including a blower that is connected to an inlet opening on the high pressure side and an outlet opening on the low pressure side, and an evaporator for the conditioning of air. The air drawn in through the inlet opening is dehumidified when flowing over the evaporator. The water condensed at the evaporator surface and the water entering through the inlet opening are drained out of the casing over an outflow arrangement. The outflow arrangement is provided with channels that extend from the high pressure side of the blower or the casing in an area below the evaporator to the low pressure side. The accumulated liquid is drained on the low pressure side over an outlet opening in the bottom of the casing.

The drainage of the water through the channels formed in the casing is based on the pressure ratio within the system. The inlet area of the first channels is disposed in line with the direction of the flow of air before the evaporator, and the inlet area of the second channels is disposed below or behind the evaporator. Accordingly, the water that enters through the inlet opening into the casing is transported through the blower and drained off through the first channels, and the condensate produced in the evaporator is drained off through the second channels. A water column in the drain of the drainage arrangement, which is unable to drain off because a low pressure is applied, reduces leakage to the environment of the vehicle.

EP 2 000 338 A1 and EP 2 062 762 A1 disclose an internal drainage arrangement where the water is led from the air inlet over the blower casing to the evaporator casing, and into the environment. The water is directed to the drainage only after having passed the blower.

The air inlet and the blower casing are connected to each other in their lower areas such that the water that has accumulated in the lower area of the air inlet is directed through an opening into the lower area of the blower casing. The lower area of the blower casing is connected to the upper area of the casing of the HVAC system. Water that has been directed through the blower casing below the blower is directed over a water draining groove established at the inner side of the blower casing and into the lower area of the casing of the HVAC system. The water is then drained off into the environment. Hence, the water to be drained enters into the evaporator casing above the evaporator. The lowest point of the air inlet must be located above the lower area of the blower casing and above the evaporator in order to ensure the water is drained off.

The air is drawn in by the blower and delivered into the casing of the HVAC system. The air is transported from the air inlet channel, through the blower casing, and to the casing of the HVAC system. The blower produces the air flow due to a pressure differential.

As a result of the existing pressure conditions, the air that enters into the casing of the HVAC system is discharged opposite the direction of water drainage through a connection established between the air inlet area having the lowest pressure and the blower casing area having the highest pressure within the HVAC system. The air is passed from the blower casing into the air inlet. The water is passed opposite the direction of flow of the air from the air inlet into the blower casing, which impedes sufficient drainage. Due to the lack of an altitude differential, no water column is established to overcome the opposing pressure differential and the HVAC only operates optimally in switched off condition.

Additionally, intense acoustic emissions can occur due to the connection between the blower casing and the evaporator, the connection being placed in the area of high pressure and very high velocity.

Furthermore, the water to be drained is passed over the evaporator so that water drops form at the evaporator surface, which can be entrained by the current of the air to be conditioned and directed into the interior of the vehicle. The arrangement of the water entry into the diffuser above the evaporator restricts the application to high HVAC devices and limits the installation possibilities.

The prior art teaches HVAC devices where the water entering through an inlet opening into the casing of the HVAC device is delivered through the blower before it is directed off to the drainage. Moreover, known systems, which due to design and pressure differences do not ensure sufficient drainage, have a great extension in height requiring special spacing requirements for the installation of the HVAC device.

It would be desirable to have an HVAC device for a vehicle that allows water to penetrate through an air inlet into the casing of the HVAC device and drain into a drainage system already present for water condensing at the evaporator, reliably drains water from the casing of the HVAC device by means of a drainage system having inlet casings placed low relative to the blower, the diffuser, and the evaporator, is cost-effective to manufacture, and requires minimal maintenance and minimal space.

SUMMARY OF THE INVENTION

Consonant with the present invention, an HVAC device for a vehicle that allows water to penetrate through an air inlet into the casing of the HVAC device and drain into a drainage system already present for water condensing at the evaporator, reliably drains water from the casing of the HVAC device by means of a drainage system having inlet casings placed low relative to the blower, the diffuser, and the evaporator, is cost-effective to manufacture, and requires minimal maintenance and minimal space, has surprisingly been discovered.

The HVAC device comprises an inlet casing, an air distribution casing and a blower placed in a blower casing for drawing in air through the inlet casing and delivering the air into the air distribution casing. An evaporator is placed within the air distribution casing. Below the evaporator, a drainage system is configured for draining condensed liquid out of the air at the surface of the evaporator into the environment of the HVAC device. Gravity forces the liquid condensed out of the air, particularly water, to flow downward at the surface of the evaporator and the liquid is directed into the drainage system.

According to one embodiment of the invention, the inlet casing and the blower casing are oriented and connected to each other such that the air drawn in by the blower flows into the blower casing after having entered into the HVAC device, and passes a transition, while liquid penetrating the inlet casing accumulates in a lower area of the inlet casing. The transition between the inlet casing and the blower casing prevents the liquid entering the inlet casing from flowing off. Typically, the liquid is water.

The transition includes an edge or step, or a threshold that, due to its height, blocks the entered water. Alternatively, the lower area of the inlet casing in vertical direction, or, the direction of the height of the HVAC device, may be arranged below the blower casing.

The HVAC device according to the invention is provided with a hydraulic connection for draining the liquid penetrating the inlet casing. The hydraulic connection extends from the lower area of the inlet casing up to the drainage system and drains the liquid condensed out of the evaporator. Using the hydraulic connection, the water penetrating the inlet casing is advantageously drainable from the inlet casing into the drainage system, and directed past the blower casing and the evaporator.

In one embodiment of the invention, the hydraulic connection is configured as a channel arranged on the wall of the air distribution casing. It is especially advantageous to make the channel an integral part of the wall.

The channel may be configured as a groove having a U-shaped cross-section and an open side. Alternatively, the cross-section is may be a V-shape, W-shape, or rectangular cross-section with an open side.

In one embodiment of the invention, the channel, or inside channel, is placed on the inner side of the wall of the air distribution casing. The open side of the channel is oriented in the direction of the volume enclosed by the air distribution casing. Located within the volume enclosed by the air distribution casing, for example, is the evaporator of the refrigerant circuit of the HVAC system for the conditioning of the air.

Due to the open design of the channel, the channel connects the lower pressure area in the inlet casing to the higher pressure area in the air distribution casing. The pressure differences within the air current are produced by operating the blower. The blower draws in the air due to the low pressure through the inlet casing and delivers the air at a higher density into the air distribution casing.

The channel is arranged in the direction of the flow of the air either downstream of the evaporator or upstream of the evaporator so that the air flow passing the HVAC device travels through the channel either before passing the evaporator or after passing the evaporator. Due to the pressure loss while passing the evaporator, the air flow has a higher pressure before the evaporator than after the evaporator. While the pressure at the entry into the channel within the inlet casing is equal to the suction pressure of the blower, the pressure values within the air distribution casing vary. Therefore, due to the open design of the channel, and depending on the arrangement in the direction of the flow of the air before or after the evaporator, different pressure differences exist over the length of the channel. The pressure difference between the entry into the channel and within the air distribution casing for the arrangement of the channel in the direction of the flow of the air after the evaporator is lower than for the arrangement before the evaporator, which has an effect on the drainage of the liquid. The pressure differences should be as minimal as possible.

According to another embodiment of the invention, a member to close the open side of the channel is provided. The member is a seal closing the open channel. Accordingly and advantageously, a closed inside channel is formed. Due to the closed design, the pressures at the entry into the channel in the lower area of the inlet casing and at the exit into the drainage system have little or no differences. The differences within the channel support the drainage of the water from the inlet casing into the drainage system.

The seal is configured as an evaporator seal. Conventional evaporator seals seal the evaporator against the wall of the air distribution casing. In one embodiment of the invention, the evaporator seal is established such that it also closes the channel for the drainage water that enters into the inlet casing.

According to another embodiment of the invention, the channel is arranged as an outside closed channel on the outer side of the wall of the air distribution casing.

According to another embodiment of the invention, the inlet casing in its lower area is provided with a take-up area that provides a connection between the bottom side of the inlet casing and the channel. The take-up area may have a pan-shape or funnel-shape having a lowest point. At the lowest place, the channel is hydraulically connected to the take-up area. The liquid accumulating within the inlet casing is collected due to gravity within the pan-shaped or funnel-shaped take-up area at the lowest place and passed over an entry opening into the channel.

The invention has a number of advantages.

Because the water penetrating the inlet casing is drained off into the drainage system of the evaporator, only one drainage is required in the vehicle for the penetrating water and the water condensing out in the HVAC device. With the help of the channel closed by the seal, or the closed channel, and the location of the outlet opening of the channel near the bottom of the drainage pan, a lower pressure differential between the channel inlet and the channel outlet and the running off of the water on the slope of the pan occur, thereby optimizing drainage. Channel formation using the evaporator seal results in an outlet below the evaporator. The pressure differential between the inlet and the outlet of the water that opposes the direction of the flow of the water is overcome by the developing water column.

The establishment of the open channel closed with the help of the evaporator seal enables the HVAC device to be manufactured cost-effectively because only an appropriate shape formed within the casing wall in the direction of the demoulding has to be provided. No additional components must be provided.

Due to the minimal pressure difference existing within the channel, the developing vertical water column ensures optimal running off of the water also at high pressures.

Due to the establishment of a cover, which is arranged at the channel exit within the drainage system as a covering of the open areas of the channel between evaporator and entry into the drainage system, dirt particles that penetrate the HVAC device drain into the drainage. The U-shaped cover combined with the drainage pan forms a closed channel section. Dirt particles carried by the water are directed into the original drainage of the water condensed out at the evaporator without contacting the air to be conditioned for the passenger compartment. The open design of the channel section without a cover allowed for dirt particles to be deposited, for slowly running water, in the lower shell, and after having dried be entrained by the air and/or cause offensive smells. A channel completely closed with the cover up to the entry into the drainage system ensures that the dirt particles are removed by the water. Subsequently, during deposition, the dirt particles are not brought into contact with the air to be fed into the passenger compartment so that no smells are spread.

The design of the channel enables the air inlet to be positioned at a low level and the design to be space saving and compact, particularly in direction of the height of the HVAC device.

Additionally, only very weak acoustic emissions are produced.

BRIEF DESCRIPTION OF THE DRAWINGS

The above, as well as other advantages of the present invention, will become readily apparent to those skilled in the art from the following detailed description when considered in the light of the accompanying drawings, in which.

DETAILED DESCRIPTION OF EXEMPLARY EMBODIMENTS OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
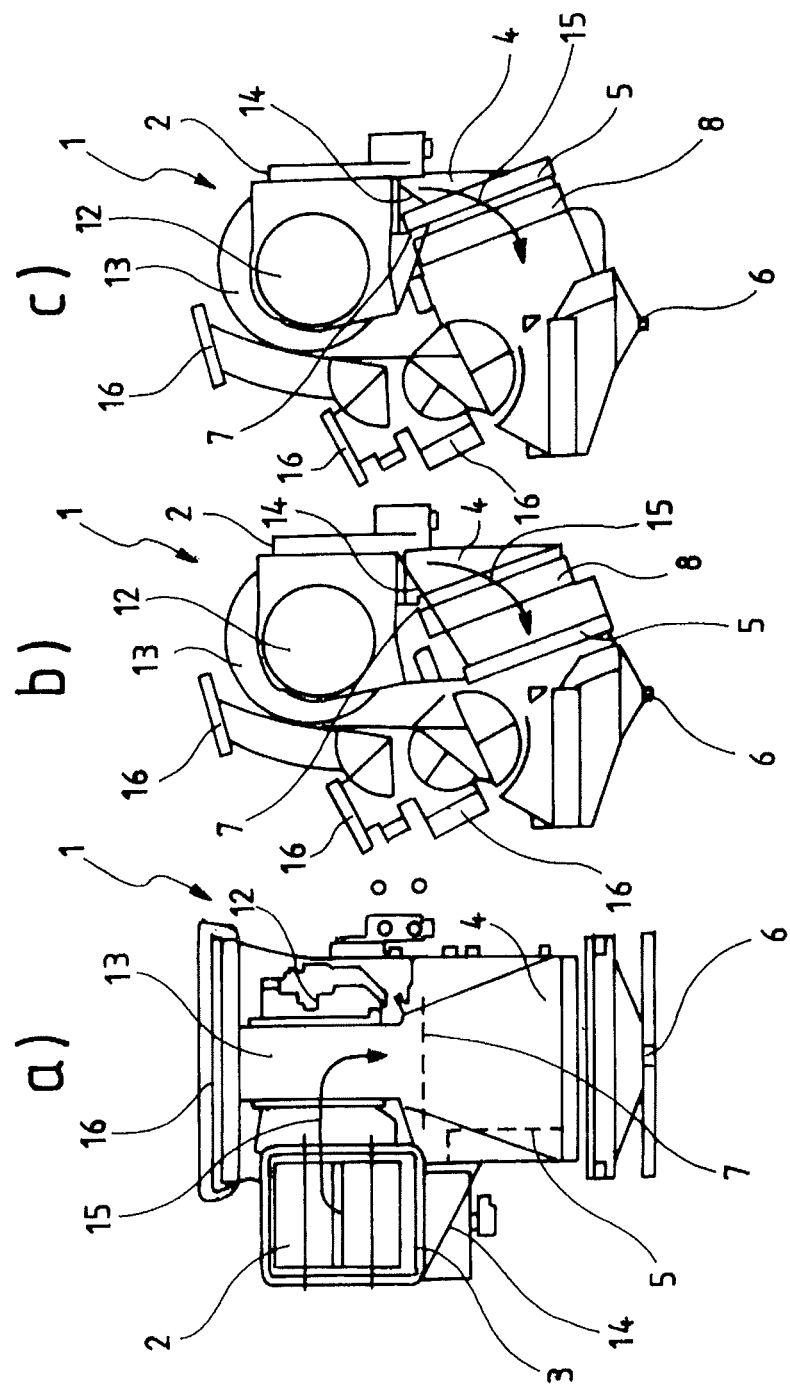
FIG. 1a shows a front elevational, fragmented view of an HVAC device with a connection between an inlet casing and an air distribution casing and a channel disposed in the air distribution casing, according to an embodiment of the invention.
FIG. 1b shows a side elevational, fragmented view of the HVAC device of FIG. 1a with the inside channel in the direction of a flow of the air after an evaporator.
FIG. 1c shows a side elevational, fragmented view of the HVAC device of FIG. 1a with the inside channel in the direction of the flow of the air before the evaporator.

FIG. 1a shows a heating ventilating and air conditioning or HVAC device 1 with an additional connection between the inlet casing 2 and the air distribution casing 4, and with a channel 5 placed in the air distribution casing 4.

The HVAC device 1 comprises an inlet casing 2 with an inlet opening through which air to be conditioned is drawn into the HVAC device 1. The inlet casing 2 of the air is established at the low pressure side of a blower 12. The blower 12 discharges the drawn air in the direction of flow 15 into an air distribution casing 4, also denominated as diffuser 4. Within the air distribution casing 4 the evaporator 8 of a refrigerant circuit of the vehicle's HVAC system is located for the cooling and/or dehumidifying of the air. After passing the evaporator 8, the air is led over further components of the HVAC device, such as additional heat exchangers and guiding members, and then to single air outlets 16. The blower 12 is placed above the evaporator 8, the upper edge 7 of which is shown in FIG. 1a.

When the air passes the evaporator 8 and is cooled and dehumidified, the humidity of the air condenses at the surfaces of the evaporator 8. The condensate is drained out of the HVAC device through a drainage system 6. The drainage system 6 is arranged below the evaporator 8 so that the condensate can run off in the direction of gravity.

Additionally, other humidity such as rain water, snow or water of the car wash enters through the inlet opening into the inlet casing 2. In order to prevent this humidity from entering into the interior of the vehicle with the air current, the humidity that accumulates in the lower area of the inlet casing 2 is drained off.

The lower area of the inlet casing 2, which is limited with regard to the accumulating humidity by the lower edge 3, is a result of a compact and space saving design of the HVAC device 1 being aligned with the level of the upper edge of the evaporator 8 placed in the air distribution casing 4. Thus, the height of the HVAC device 1 can advantageously be minimized. The accumulated liquid is not, as in conventional HVAC devices, drained over the blower casing 13 into the diffuser 4, then into the drainage system 6 of the evaporator 8, because the blower casing 13 is placed above the inlet casing 2.

Rather, the accumulated liquid is drained on the bottom side of the inlet casing 2 over a take-up area 14. The take-up area 14 is pan-shaped or funnel-shaped at its lowest place and enters into a hydraulic connection 5 that is designed as channel 5. The channel 5 is disposed within the air distribution casing 4. Furthermore, the channel 5 is located on the side at the air distribution casing 4 that encloses the evaporator 8 and extends from the take-up area 14 up to the area of the HVAC device drainage 6. So the channel 5 combined with the take-up area 14, in addition to the blower casing 13, is an additional connection between the inlet casing 2 of the air and the diffuser 4 or the drainage system 6. The water that enters into the HVAC device 1 is directed past the blower 12 from the low pressure side to the high pressure side.

The take-up area 14 is the member that couples the inlet casing 2 to the channel 5 and is sealed against the inlet casing 2 as well as the channel 5 when the HVAC device 1 is assembled horizontally.

Therefore, the humidity, for example, as rain water, snow or water of the car wash, that penetrates through the inlet opening into the inlet casing 2 is directed from the air inlet into the area of the HVAC device drainage 6 below the evaporator 8. The water is directed past the evaporator 8.

Only one drainage system 6 is required in the vehicle for water that penetrates the exterior into the HVAC device 1 and condenses out within the HVAC device 1. Due to the placement of the water outlet opening of the channel 5 in the drainage system 6, there is a lower pressure differential between the take-up area 14 as inlet into the channel 5 and the outlet, which optimizes the process of water drainage.

FIG. 1b shows the HVAC device 1 with the connection between the inlet casing 2 and the air distribution casing 4, and the inside channel 5 that is placed in the air distribution casing 4. The channel 5 is established in the direction of the flow of the air after the evaporator 8.

The water penetrating the inlet casing 2 of the air enters into the channel 5 over the take-up area 14. The channel 5 is designed as, for example, an open groove in the form of a U-shaped bulge in the air distribution casing 4, extending from the area of lower pressure in the inlet casing 2 up the area of higher pressure in the diffuser 4. Due to the placement of the channel 5 in the direction of the flow 15 of the air after the evaporator 8 and the pressure loss during passing the evaporator 8, the pressure difference between high pressure and low pressure over the whole channel 5 is low.

The water directed past the evaporator 8 is directed through the U-shaped bulge in the air distribution casing 4, outside the air current, and channeled in the casing wall into the drainage system 6 so that the water to be drained off is not carried away by the air current into the interior of the vehicle.

FIG. 1c shows an alternative embodiment of the HVAC device 1 with inside channel 5. The channel 5 is established in the direction of the flow 15 of the air before the evaporator 8.

The channel 5, an open groove in form of a U-shaped bulge in the air distribution casing 4, extends from the area of lower pressure in the inlet casing 2 up the area of higher pressure in the diffuser 4. Due to the placement of the channel 5 in the direction of the flow 15 of the air before the evaporator 8, the pressure difference between high pressure and low pressure over the channel 5 is higher compared to the placement of the channel 5 in the direction of the flow 15 after the evaporator 8.

Figure 2:
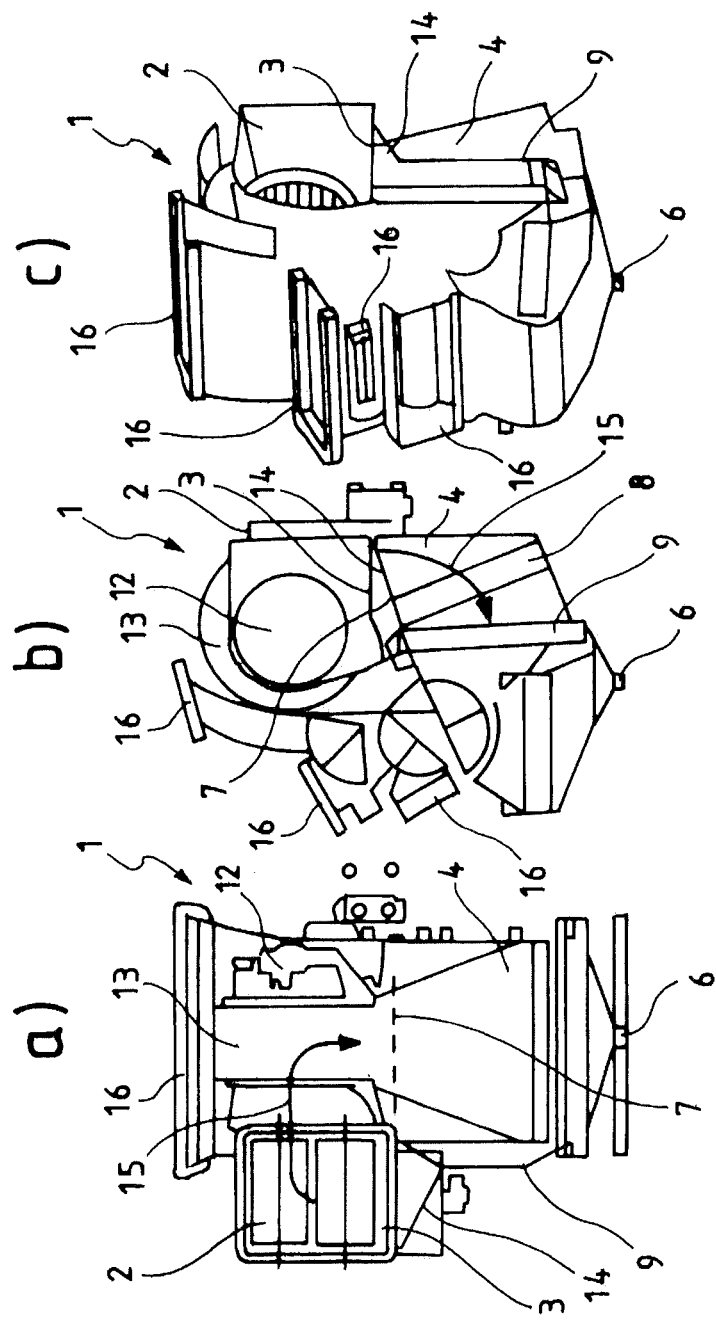
FIG. 2a shows a front elevational, fragmented view of an HVAC device with a channel placed outside a air distribution casing, according to an embodiment of the invention.
FIG. 2b shows a side elevational, fragmented view of the HVAC device of FIG. 2a with the outside channel.
FIG. 2c shows a front perspective view of the HVAC device of FIG. 2a with the outside channel.

FIG. 2a shows the HVAC device 1 with a channel 9 placed outside at the air distribution casing 4, in front view.

In another embodiment of the HVAC device 1, the liquid accumulated at the bottom side of the inlet casing 2 is drained off over the pan-shaped or funnel-shaped take-up area 14 into a hydraulic connection 9, which is established as outside channel 9 disposed outside of the air distribution casing 4. The channel 9 is an integral part of the air distribution casing 4 and extends from the take-up area 14 up to the area of the HVAC device drainage 6. The water penetrating the HVAC device 1 before reaching the blower casing 13 is directed out of the casing which leads the air current of the HVAC device 1.

The outside channel 9 extends from the inlet casing 2 as closed channel 9 on the outside of the diffuser 4 to the drainage system 6 and has no open side to the high pressure area of the HVAC device 1 or the air current. Accordingly, only a very low pressure difference is applied to the open sides of the channel 9 that are formed by the take-up area 14 and the drainage system 6. The low pressure difference enables optimal water drainage into the HVAC device drainage 6.

In the FIGS. 2b and 2c, the HVAC device 1 with the channel 9 arranged outside at the air distribution casing 4 is shown.

The channel 9, due to its outside placement, and in contrast to the inside channel 5, is independent of the air current.

The water penetrating the inlet casing 2 of the air enters into the channel 9 over the take-up area 14 and then directed outside the air distribution casing 4 within the closed channel 9 to the drainage system 6 of the evaporator 8. The water to be drained is transported having no contact with the air current to be fed into the interior of the vehicle.

Figure 3:
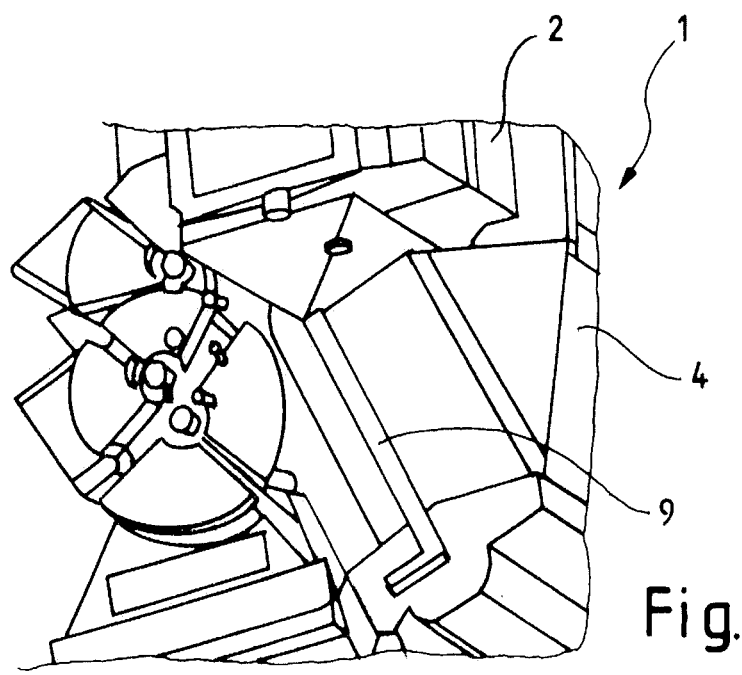
FIG. 3 shows an elevational, sectional view of a channel within a wall of an air distribution casing according to an embodiment of the invention.
Figure 4:
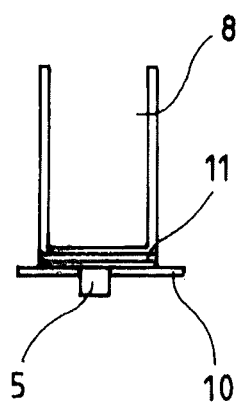
FIG. 4 shows an elevational, sectional view of a U-shaped channel groove closed by an evaporator seal within a casing wall, according to an embodiment of the invention.

In FIG. 3, the HVAC device 1 is shown with a channel 5 placed within the wall of the air distribution casing 4. FIG. 4 shows the channel 5 as a U-shaped groove closed by a seal 11 within the wall of the diffuser 4.

The embodiments according to FIGS. 3 and 4 combine the advantages of the open inside channel 5 according to FIGS. 1a, 1b, and 1c with those of the closed outside channel 9 according to FIGS. 2a, 2b, and 2c.

The channel 5 disposed within the wall of the air distribution casing 4 as an open groove in form of a U-shaped bulge is advantageously closable, and is thereby exposed to zero or minimal pressure differences within the HVAC device 1. Due to the demoulding direction of the plastic casing of the diffuser 4, an additional component for closing is necessary in form of a cover or the like, which would admittedly make manufacturing and assembly of the HVAC device 1 more difficult and costly.

The open configured inside channel 5 for the specific draining off of the water entering the HVAC device drainage 6 is also coverable or closable using the evaporator seal 11. The conventional evaporator seal 11, which rotatingly seals the evaporator 8 to the casing wall in order to avoid leakage flow between the evaporator 8 and the casing wall, has a larger width than the channel 5. After installation of the evaporator 8 with the accompanying seal 11, a closed inside channel 5 is created.

Accordingly, the evaporator seal 11 seals the evaporator 8 against the casing wall and also closes the channel 5 for draining off the water penetrating the HVAC device 1.

The use of the open channel 5 that is closed by the evaporator seal 11 makes it possible to have a cost-effective design of the HVAC device 1. The channel 5 is formed with the appropriate shape in the casing wall of the diffuser 4 in the demoulding direction so that no additional drainage system 6 with other components and modifications of the HVAC device 1 is required. The HVAC device 1 is designed to be compact and space saving due to the configuration of the channel 5 as a bypass. The height of the HVAC device 1 is minimized.

The water drained off is directed past the evaporator 8, past the air current, to be conditioned for the interior of the vehicle. The pressure difference between the take-up area 14 as inlet into the channel 5 and the outlet is minimized so that the process of draining off the water is optimized.

From the foregoing description, one ordinarily skilled in the art can easily ascertain the essential characteristics of this invention and, without departing from the spirit and scope thereof, can make various changes and modifications to the invention to adapt it to various usages and conditions.

| NOMENCLATURE | |
|---|---|
| 1 | HVAC device |
| 2 | inlet casing air |
| 3 | lower edge inlet casing air |
| 4 | air distribution casing, diffusor |
| 5 | hydraulic connection, inside channel, channel |
| 6 | HVAC device drainage, drainage system |
| 7 | upper edge evaporator refrigerant circuit |
| 8 | evaporator refrigerant circuit, heat exchanger |
| 9 | hydraulic connection, outside channel, channel |
| 10 | casing wall |
| 11 | seal, evaporator seal |
| 12 | blower |
| 13 | blower casing |
| 14 | take-up area |
| 15 | direction of flow of the air |
| 16 | air outlet |

The invention claimed is:

1. A heating ventilating and air conditioning device for a vehicle comprising:
   an inlet casing;
   an air distribution casing in fluid communication with the inlet casing;
   a blower disposed in a blower casing and in fluid communication with the air distribution casing, the blower drawing air through the inlet casing and into the air distribution casing;
   an evaporator disposed within the air distribution casing beneath the blower; and
   a drainage system disposed below the evaporator for draining a liquid condensed from air at a surface of the evaporator,
   wherein the liquid in the air flowing through the inlet casing accumulates in a lower portion of the inlet casing, and
   wherein the liquid condensed from the air at the surface of the evaporator drains from the inlet casing, through a hydraulic connection disposed between the lower portion of the inlet casing and the drainage system, past the blower casing and evaporator, and into the drainage system, so the liquid in the air flowing through the inlet casing and the liquid condensed from the air at the surface of the evaporator join and flow through the hydraulic connection.

2. The heating ventilating and air conditioning device according to claim 1, wherein the hydraulic connection is a channel disposed on a wall of the air distribution casing.

3. The heating ventilating and air conditioning device according to claim 2, wherein the channel is an integral part of the wall.

4. The heating ventilating and air conditioning device according to claim 3, wherein the channel is a groove having a U-shaped cross-section.

5. The heating ventilating and air conditioning device according to claim 4, wherein the channel is disposed on an outside surface of the wall of the air distribution casing.

6. The heating ventilating and air conditioning device according to claim 2, wherein the channel is disposed on an inside surface of the wall of the air distribution casing, and wherein the channel has an open side facing an interior of the air distribution casing.

7. The heating ventilating and air conditioning device according to claim 6, wherein the open side of the channel is closed by a seal.

8. The heating ventilating and air conditioning device according to claim 7, wherein the seal connects the evaporator to the wall of the air distribution casing.

9. The heating ventilating and air conditioning device according to claim 2, wherein the evaporator is upstream of the channel in a direction of air flow.

10. The heating ventilating and air conditioning device according to claim 2, wherein the channel is upstream of the evaporator in a direction of air flow.

11. The heating ventilating and air conditioning device according to claim 1, wherein the lower portion of the inlet casing includes a take-up area connecting the lower portion of the inlet casing to the hydraulic connection.

12. The heating ventilating and air conditioning device according to claim 11, wherein the take-up area is one of a pan-shape and a funnel-shape having a lowest point and the hydraulic connection connects to the take-up area at the lowest point.

13. A heating ventilating and air conditioning device for a vehicle comprising:
   an inlet casing;
   an air distribution casing in fluid communication with the inlet casing;
   a blower disposed in a blower casing and in fluid communication with the inlet casing, the for drawing air through the inlet casing and into the air distribution casing;
   an evaporator disposed within the air distribution casing beneath the blower; and
   a drainage system disposed below the evaporator for draining a liquid condensed from air at a surface of the evaporator,
   wherein the liquid in the air flowing through the inlet casing accumulates in a lower portion of the inlet casing,
   wherein the liquid condensed from the air at the surface of the evaporator drains from the inlet casing, through a channel disposed between the lower portion of the inlet casing and the drainage system, past the blower casing and evaporator, and into the drainage system, so the liquid in the air flowing through the inlet casing and the liquid condensed from the air at the surface of the evaporator join and flow through the channel, wherein the channel is a groove having a U-shaped cross-section disposed on an inside surface of a wall of the air distribution casing, and wherein the channel has an open side facing an interior of the air distribution casing.

14. The heating ventilating and air conditioning device according to claim 13, wherein the evaporator is upstream of the channel in a direction of air flow.

15. The heating ventilating and air conditioning device according to claim 13, wherein the channel is upstream of the evaporator in a direction of air flow.

16. The heating ventilating and air conditioning device according to claim 13, wherein the open side of the channel is closed by a seal.

17. The heating ventilating and air conditioning device according to claim 16, wherein the seal connects the evaporator to the wall of the air distribution casing.

18. The heating ventilating and air conditioning device according to claim 13, wherein the lower portion of the inlet casing includes a take-up area connecting the lower portion of the inlet casing to the channel.

19. The heating ventilating and air conditioning device according to claim 18, wherein the take-up area is one of a pan-shape and a funnel-shape having a lowest point and the channel connects to the take-up area at the lowest point.

20. A heating ventilating and air conditioning device for a vehicle comprising:
an inlet casing;
an air distribution casing in fluid communication with the inlet casing;
a blower disposed in a blower casing and in fluid communication with the inlet casing, the blower drawing air through the inlet casing and into the air distribution casing;
an evaporator disposed within the air distribution casing beneath the blower; and
a drainage system disposed below the evaporator for draining a liquid condensed from air at a surface of the evaporator,
wherein the liquid in the air flowing through the inlet casing accumulates in a lower portion of the inlet casing,
wherein the liquid condensed from the air at the surface of the evaporator drains from the inlet casing, through a channel disposed between the lower portion of the inlet casing and the drainage system, past the blower casing and evaporator, and into the drainage system, so the liquid in the air flowing through the inlet casing and the liquid condensed from the air at the surface of the evaporator join and flow through the channel,
wherein the channel is a groove having a U-shaped cross-section disposed on an inside surface of a wall of the air distribution casing,
wherein the channel has an open side facing an interior of the air distribution casing,
wherein the lower portion of the inlet casing includes a take-up area connecting the lower portion of the inlet casing to the channel, and
wherein the take-up area is one of a pan-shape and a funnel-shape having a lowest point, and the channel connects to the take-up area at the lowest point.

* * * * *